United States Patent
Ono et al.

[11] Patent Number: 5,896,392
[45] Date of Patent: Apr. 20, 1999

[54] DEVICE AND METHOD FOR AUTOMATICALLY CONTROLLING DECISION POINTS

[75] Inventors: Takashi Ono; Yutaka Yano, both of Tokyo, Japan

[73] Assignee: Nec Corporation, Tokyo, Japan

[21] Appl. No.: 08/878,946

[22] Filed: Jun. 19, 1997

[30] Foreign Application Priority Data

Jun. 20, 1996 [JP] Japan .................... 8-160154

[51] Int. Cl.$^6$ .................................................. G06F 11/00
[52] U.S. Cl. ................................ 371/5.2; 371/5.4; 375/225
[58] Field of Search ............................ 371/5.1, 5.2, 5.3,
371/5.4, 28, 64, 67.1, 57.1, 61, 68.1; 375/226,
227, 25

[56] References Cited

U.S. PATENT DOCUMENTS

| | | | |
|---|---|---|---|
| 5,210,712 | 5/1993 | Saito | 364/825 |
| 5,319,650 | 6/1994 | Mizutani et al. | 371/46 |
| 5,635,875 | 6/1997 | Kusakabe | 375/374 |
| 5,703,409 | 12/1997 | Fukumitsu | 371/5.1 |

OTHER PUBLICATIONS

Neal S. Bergano et al, "Margin Measurements in Optical Amplifier Systems", *IEEE Photonics Technology Letters*, vol. 5, No. 3, Mar. 1993, pp. 304–306.

M. Kawai et al, "Smart Optical Receiver with Automatic Decision Threshold Setting and Retiming Phase Alignment", *Journal of Lightwave Technology*, vol. 7, No. 11, Nov. 1989, pp. 1634–1640.

*Primary Examiner*—Trinh L. Tu
*Attorney, Agent, or Firm*—Sughrue, Mion, Zinn, MacPeak & Seas, PLLC

[57] ABSTRACT

An automatic decision-point control type decision circuit has a main decision unit, a sub-decision unit, an exclusive-OR circuit, and a controller. The main decision unit receives a data signal and one of two branched signals while the sub-decision unit receives the data signal and the other of the two branched signals. The two branched signals is obtained by branching a clock signal extracted from the data signal. The exclusive-OR circuit detects the difference between the output signal from the main decision unit and the output from the sub-decision unit. The controller calculates a bit error rate. In order to set the initial value of the decision point of the main decision unit, the controller detects a bit error rate by scanning the difference between the decision point of the main decision unit and the decision point of the sub-decision unit only at the beginning of its operation, and calculates an optimum decision point based on the relationship between the decision points and the bit error rate. Next, to control the decision point of the main decision unit, an optimum decision point is controlled based on the relationship between the bit error rate and a bit error rate detected by scanning only the decision point of the decision unit. This control operation is repeated.

12 Claims, 3 Drawing Sheets

DEVICE AND METHOD FOR AUTOMATICALLY CONTROLLING DECISION POINTS

BACKGROUND OF THE INVENTION

The present invention relates to an automatic decision-point control type decision circuit suitable for use in optical receivers that automatically controls a decision point to an optimum value. The present invention also relates to a decision point controlling method.

Recently, optical amplification repeat transmission systems that amplify optical signals without regenerations and repeat them for long distance transmission are proceeding toward practical use. In such transmission systems, amplified spontaneous emission (ASE) noises which will occur in optical amplification repeaters may be induced to optical signals. Optical signal to ASE beat noises become dominant in the noise distribution in received waveforms after transmission. As a result, as shown in FIG. 5, the noise power of the mark (1) level is larger than that of the mark (0) level, so that the optimum decision point changes.

Moreover, when a change in waveform occurs because of the chromatic dispersion and non-linear effect in an optical fiber, the optimum decision phase often changes. As described above, when an optical signal is long-transmitted in an optical fiber, the value of an optimum decision point (or decision voltage, or decision phase) at which the bit error rate is minimized changes in comparison with that before transmission. This change requires readjustment of the optimum decision point. However since manual readjustment increases the cost of the system, a method of automatically controlling the decision point to an optimum value has been long waited. Conventionally, the automatic decision-point controlling method using three decision units (refer to the paper, "Smart Optical Receiver With Automatic Decision Threshold Setting and Retiming Phase Alignment" by M. Kawai, et al., in *Journal of Light wave Technology*, Vol. 7, No. 11 (1989), pp. 1634–1640) has been well known as an automatic decision-point adjusting method.

According to the automatic conventional decision-point adjusting method, Vth is controlled to an optimum point by obtaining an error signal based on the difference between the output of a first decision unit set to the center decision voltage Vth and the output signals of the second and third decision units set to Vth±ΔV.

However, the conventional automatic decision-point adjusting method requires three decision units, thus resulting in the large-sized circuit configuration and increased costs. Moreover, the problem is that because branching a signal into three signals decreases the signal level, the signal to noise ratio (SNR) of a received signal is degraded.

SUMMARY OF THE INVENTION

The objective of the present invention is to solve the above-mentioned tasks. Moreover, the objective of the invention is to provide an automatic decision-point control type decision circuit that has its sustained circuit scale and can be miniaturized at low costs. Another object of the invention is to provide an decision-point controlling method that allows an automatic decision-point control type decision circuit to be miniaturized at low costs.

The objective of the present invention is achieved by an automatic decision-point control type decision circuit comprising a first variable phase shifter for receiving a first clock signal being obtained by branching a clock signal into two; a second variable phase shifter for receiving a second clock signal being obtained by branching the clock signal into two; a main decision unit for receiving a clock signal output from the first variable phase shifter and a first data signal being obtained by branching a data signal into two; a sub-decision unit for receiving a clock signal output from the second variable phase shifter and a second data signal being obtained by branching the data signal into two; an exclusive-OR circuit for receiving output of the main decision unit and output of the sub-decision unit; a counter for counting the number of pulses output from the exclusive-OR circuit; and a controller for calculating output of the counter and for controlling a decision point of the main decision unit and a decision point of the sub-decision unit.

According to the present invention, the controller comprises means for setting a main decision voltage of the main decision unit to Vm and an sub-decision voltage of the sub-decision unit to Vs; scanning a voltage stepwise at the beginning of an control operation while the difference between Vm and Vs is maintained to ΔV; measuring the number of pulses counted during a predetermined measurement time at each increment voltage Vs, based on output of the counter; calculating a bit error rate based on the number of the pulses and the measurement time; calculating a value y by substituting the bit error rate for an inverse function of a complement error function; calculating an optimum decision voltage based on a relationship between the Vs and the y; and changing an initial value of Vm into the optimum decision voltage.

According to the present invention, the controller comprises means for setting a main decision phase of the decision unit to $\phi m$ and a sub-decision phase of the sub-decision unit to $\phi s$; scanning a phase stepwise at the beginning of a control operation while the difference between $\phi m$ and $\phi s$ is maintained to $\Delta\phi$; measuring the number of pulses counted during a predetermined measurement time in each increment phase $\phi s$, based on output of the counter; calculating a bit error rate based on the number of the pulses and the measurement time; calculating a value y by substituting the bit error rate for an inverse function of a complement error function; calculating an optimum decision phase based on a relationship between the $\phi s$ and said y; and varying an initial value of $\phi m$ into the optimum decision phase.

According to the present invention, the controller comprises means for setting a main decision voltage of the main decision unit to Vm and a sub-decision voltage of the sub-decision unit to Vs; scanning a voltage Vs stepwise while Vm is maintained at a fixed value; measuring the number of pulses counted during a predetermined measurement time in each increment voltage Vs, based on output of the counter; calculating a bit error rate based on the number of the pulses and the measurement time; calculating a value y by substituting the bit error rate for an inverse function of a complement error function; calculating an optimum decision voltage based on a relationship between the Vs and the y; varying an initial value of Vm into the optimum decision voltage; and repeating the above-described control operation to control Vm to an optimum decision voltage.

According to the present invention, the controller comprises means for setting a main decision phase of the main decision unit to $\phi m$ and a decision phase of the sub-decision unit to $\phi s$; scanning a phase $\phi s$ stepwise at the beginning of a control operation while $\phi m$ is maintained at a fixed value; measuring the number of pulses counted during a predetermined measurement time in each increment phase $\phi s$, based on output of the counter; calculating a bit error rate based on the number of the pulses and the measurement time; calculating a value y by substituting the bit error rate for an inverse function of a complement error function; calculating an optimum decision phase based on a relationship between the φs and the y; varying φm into the optimum decision phase; and repeating the above-described control operation to control always φm to an optimum decision phase.

According to the present invention, the controller comprises means for alternately performing a first control and a second control. The first control includes the steps of setting a main decision voltage of the main decision unit to Vm and a sub-decision voltage of the sub-decision unit to Vs; scanning a voltage Vs stepwise while Vm is maintained at a fixed value; measuring the number of pulses counted during a predetermined measurement time in each increment voltage Vs, based on output of the counter; calculating a bit error rate based on the number of the pulses and the measurement time; calculating a value y by substituting the bit error rate for an inverse function of a complement error function; calculating an optimum decision voltage based on a relationship between the Vs and the y; and varying an initial value of Vm into the optimum decision voltage. The second control includes the steps of setting a main decision phase of the main decision unit to m and a decision phase of the sub-decision unit to φs; scanning a phase φs stepwise at the beginning of a control operation while φm is maintained at a fixed value; measuring the number of pulses counted during a predetermined measurement time in each increment phase φs, based on output of the counter; calculating a bit error rate based on the number of the pulses and the measurement time; calculating a value y by substituting said bit error rate for an inverse function of a complement error function; calculating an optimum decision phase based on a relationship between the φs and said y; and varying φm into the optimum decision phase.

According to the present invention, the automatic decision-point control type decision circuit further includes means for expanding pulse width of a pulse output from the exclusive-OR circuit.

Furthermore, according to the present invention, an automatic decision-point controlling method comprises the steps of setting a main decision voltage to Vm and an sub-decision voltage to Vs; scanning a voltage stepwise at the beginning of an control operation while the difference between Vm and Vs is maintained to ΔV; measuring the number of pulses counted during a predetermined measurement time at each increment voltage Vs; calculating a bit error rate based on the number of the pulses and the measurement time; calculating a value y by substituting the bit error rate for an inverse function of a complement error function; calculating an optimum decision voltage based on a relationship between the Vs and said y; and changing an initial value of Vm into the optimum decision voltage.

According to the present invention, an automatic decision-point controlling method comprises the steps of setting a main decision phase to φm and a sub-decision phase to φs; scanning a phase stepwise at the beginning of a control operation while the difference between φm and φs is maintained to Δφ; measuring the number of pulses counted during a predetermined measurement time in each increment phase φs; calculating a bit error rate based on the number of the pulses and the measurement time; calculating a value y by substituting the bit error rate for an inverse function of a complement error function; calculating an optimum decision phase based on a relationship between the φs and said y; and varying an initial value of φm into the optimum decision phase.

According to the present invention, an automatic decision-point controlling method comprising the step of repeating a control operation to control Vm to an optimum decision voltage. The repeating step includes the steps of setting a main decision voltage to Vm and a sub-decision voltage to Vs; scanning a voltage Vs stepwise while Vm is maintained at a fixed value; measuring the number of pulses counted during a predetermined measurement time in each increment voltage Vs; calculating a bit error rate based on the number of the pulses and the measurement time; calculating a value y by substituting the bit error rate for an inverse function of a complement error function; calculating an optimum decision voltage based on a relationship between said Vs and said y; varying an initial value of Vm into the optimum decision voltage.

According to the present invention, an automatic decision-point controlling method comprises the step of repeating a control operation to control always φm to an optimum decision phase. The repeating step includes the steps of setting a main decision phase to φm and a decision phase to φs; scanning a phase φs stepwise at the beginning of a control operation while φm is maintained at a fixed value; measuring the number of pulses counted during a predetermined measurement time in each increment phase φs; calculating a bit error rate based on the number of the pulses and the measurement time; calculating a value y by substituting the bit error rate for an inverse function of a complement error function; calculating an optimum decision phase based on a relationship between the φs and said y; and varying φm into the optimum decision phase.

According to the present invention, an automatic decision-point controlling method comprises the step of repeating a control operation to control always Vm to an optimum decision voltage. The repeating step includes the steps of setting a main decision voltage to Vm and a sub-decision voltage to Vs; scanning a voltage Vs stepwise while Vm is maintained at a fixed value; measuring the number of pulses counted during a predetermined measurement time in each increment voltage Vs; calculating a bit error rate based on the number of the pulses and the measurement time; calculating a value y by substituting the bit error rate for an inverse function of a complement error function; calculating an optimum decision voltage based on a relationship between the Vs and the y; varying an initial value of Vm into the optimum decision voltage; setting a main decision phase to φm and a decision phase to φs; scanning a phase φs stepwise at the beginning of a control operation while φm is maintained at a fixed value; measuring the number of pulses counted during a predetermined measurement time in each increment phase φs; calculating a bit error rate based on the number of the pulses and the measurement time; calculating a value y by substituting the bit error rate for an inverse function of a complement error function; calculating an optimum decision phase based on a relationship between the φs and the y; and varying φm into the optimum decision phase.

According to the present invention, two decision units can realize automatic decision-point control. One decision unit acts as a main decision unit while the other decision unit acts as a sub-decision unit. In order to control the decision point of the main decision unit, a bit error rate is detected based on the difference between the output of the main decision unit and the output of the sub-decision unit by scanning the decision point of the sub-discriminator. Then an optimum decision point is calculated based on an decision point and the bit error rate. In order to avoid the failure pulling at the beginning of control, the decision point of the main decision unit and the decision point of the sub-decision unit are simultaneously scanned only at the beginning of control while a small difference is maintained between the decision points so that the decision point at the beginning of control is set.

A data signal received is branched into two branched data signals. One branched data signal is input to the main decision unit while the other branched data signal is input to the sub-decision unit. A clock signal extracted from a data signal is also branched into two branched clock signals. One clock signal is input to the main decision unit while the other clock signal is input to the sub-decision unit. The main decision unit produces a data signal regenerated to be output as a receive signal. The exclusive-OR (EX-OR) circuit receives output from the main decision unit and output from the sub-decision unit. The EX-OR circuit produces "1" only when the output of the main decision unit differ from the output of the sub-decision unit. The bit error rate can be obtained by counting the number of pulses output from the EX-OR circuit every fixed time.

According to the present invention, both the main decision unit and the sub-decision unit are differently changed so that they can be controlled to an optimum decision-point in similar control procedures.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, an automatic decision-point control type decision circuit and an automatic decision-point controlling method according to embodiments of the present invention will now be described in detail below with reference to the attached drawings.

The first embodiment relates to an automatic decision-point control type decision circuit configuration applied to an optical receiving system in a 10 Gb/s, optical intensity modulation/direct detection receive (IM-DD) scheme.

Figure 1:
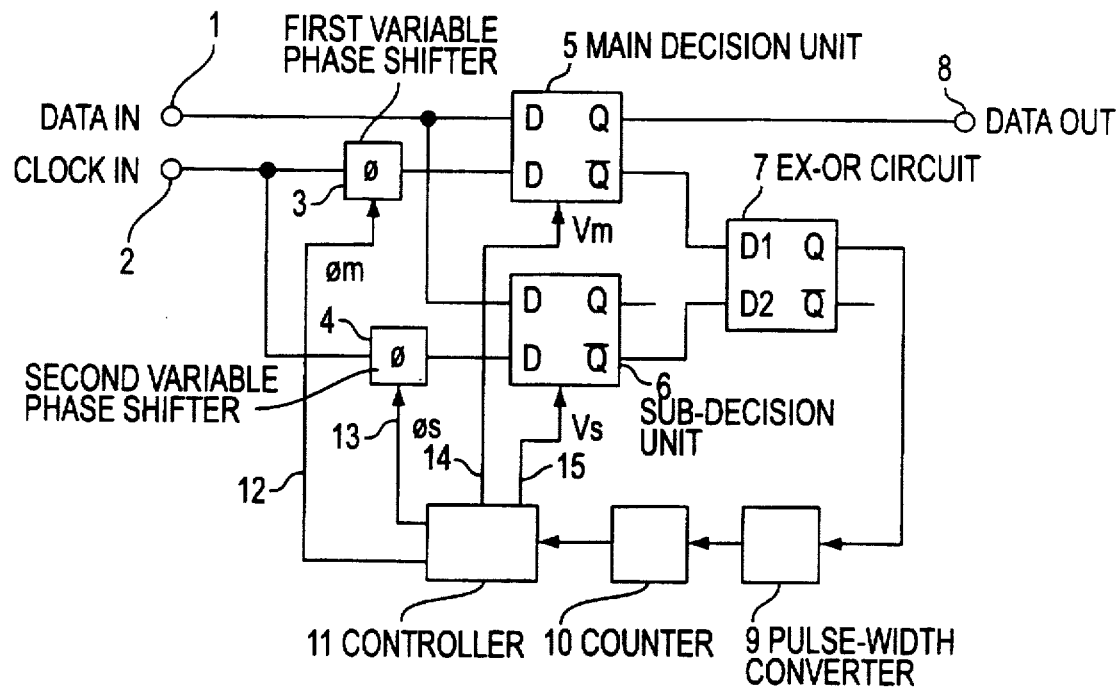
FIG. 1 is a block circuit diagram showing an automatic decision-point control type decision circuit according to a first embodiment of the present invention.

Referring to FIG. 1, the automatic decision-point control type decision circuit according to the first embodiment includes a data signal input terminal 1 for inputting data signals (Data IN), a clock signal input terminal 2 for inputting clock signals (Clock In), a first variable phase shifter 3 for inputting a first clock signal, a second variable phase shifter 4 for receiving a second clock signal, a main decision unit 5 for receiving a first clock signal and the first data signal output from the first variable phase shifter, and a sub-decision unit 6 for receiving a second clock signal and the second data signal output from the second variable phase shifter 4. The first clock signal and the second clock signal are obtained by branching a clock signal in two. The first data signal and the second data signal are obtained by branching a data signal in two.

The automatic decision-point control type decision circuit further includes an exclusive OR (EX-OR) circuit 7 for receiving output from the main decision unit 5 and output from the sub-decision unit 6, a pulse-width converter 9 for receiving a pulse produced only when the output of the main decision unit 5 or the sub-decision unit 6 occurs a code error, a counter 10 for counting the number of pulses output from the EX-OR circuit 7, a controller 11 for reading and calculating output from the counter 10 and for respectively controlling the decision point of the main decision unit 5 and the decision point of the sub-decision unit 6, and a data signal output terminal 8 for outputting a decision data signal (Data OUT) output from the main decision unit 5.

In FIG. 1, numeral 12 represents a decision phase control signal output from the controller 11 to the first phase shifter 3. Numeral 13 represents a decision phase control signal output from the controller 11 to the second variable phase shifter 4. Numeral 14 represents a decision voltage control signal output from the controller 11 to the main decision unit 5. Numeral 15 represents a decision voltage control signal output from the controller 11 to the sub-decision unit 6.

Figure 2:
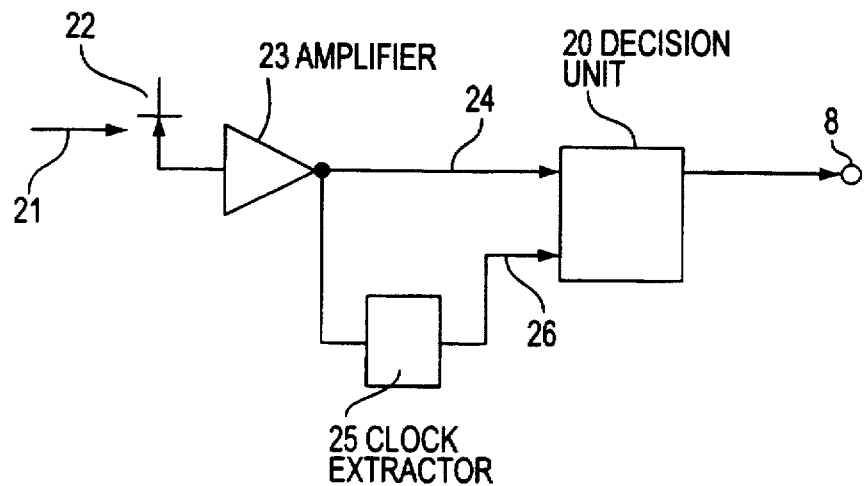
FIG. 2 is a block circuit diagram showing an optical receiver embodying an automatic decision-point control type decision circuit according to the first embodiment of the present invention.

FIG. 2 shows an optical receiving system employing the above-mentioned automatic decision-point control type decision circuit. In the optical receiving system, the photodetector 22 converts a 1550 nm-wavelength optical signal modulated at 10 Gb/s into an electrical signal. The amplifier 23 amplifies the electrical signal and then outputs a data signal 24. The clock extractor 25 extracts the clock signal 26 from the data signal 24. The clock extractor 25 uses a well-known non-linear extracting method using a differential folding circuit and a dielectric filter.

The data signal 24 is input to the data signal input terminal 1 of the automatic decision-point control type decision unit 20 (corresponding to the automatic decision-point control type decision unit shown in FIG. 1). The clock signal 26 is input to the clock signal input terminal 2 of the automatic decision-point control type decision unit 20. The data signal 24 input is branched into two signals: one being input to the main decision unit 5 and the other being output to sub-decision unit 6. Likewise, the clock signal 26 is branched into two signals. Of the two signals, one signal is input to the main decision unit 5 via the first variable phase shifter 3 while the other signal is input to the sub-decision unit 6 via the second variable phase shifter 4.

After the branching operation, the amplitude of the data signal 24 and the amplitude of the clock signal 26 are set to 1 volt peak to peak (varying from 0 volt to 1 volt). The main decision unit 5 regenerates the data signal 24 at a rise time of a clock signal and outputs a first decision data signal (Q)

and a first reversed decision data signal (Q bar). The sub-decision unit 6 regenerates the data signal 24 at a rise time of a clock signal and outputs a second decision data signal (Q) and a second reversed decision data signal (Q bar). The EX-OR circuit 7 receives the first reversed decision data signal (Q bar) and the second reversed decision signal (Q bar). The EX-OR circuit 7 produces "0" when two input signals thereto are equal to (e.g. (0,0), (1,1)) and produces "1" when two input signals thereto are different from each other (e.g. (0,1), (1,0)).

That is, the EX-OR circuit 7 outputs a pulse only when a code error occurs in the output of the main decision unit 5 or the sub-decision unit 6. The pulse width converter 9 extends the width of the pulse and then inputs the resultant pulse to the counter 10. The pulse width converter 9 is used such that a low-speed counter can count pulses. If a high-speed counter is used, the pulse width converter 9 can be omitted.

The controller 11 reads the output from the counter 10 every constant measurement time (e.g. every one seconds) and then measures a bit error rate (BER) based on the ratio of the number of pulses counted within the constant measurement time to the measurement time. The optimum decision point is obtained by applying the measured BER to the calculating method (to be described later). Thus, the decision voltage Vm and the decision phase φm of the main decision unit 5 are controlled. In this case, a personal computer, for example, is used for the controller 11.

To simplify the explanation of the control operation, only the control of the decision voltage Vm will be explained below. The same procedure will be applied to the control of the decision phase φm. The control operation is divided into (1) initial control procedure and (2) steady-state control procedure. The initial control procedure is performed to avoid the failure pulling effect by which the decision circuit is erroneously stabilized at an optimum decision point when the decision voltage Vm of the main decision unit 5 deviates largely from the optimum decision point at a start-up time.

Concerning the initial control procedure (1): First of all, when the pulling operation starts, a small difference (ΔV or Δφ) is maintained between the decision point of the main decision unit 5 and the decision point of the sub-decision unit 6. Then, both the decision point of the main decision unit 5 and the decision point of the sub-decision unit 6 are scanned simultaneously stepwise while the difference is maintained. In each decision point, the EX-OR circuit 7 outputs the EX-OR output, or a number of pulses, at every constant time intervals. This operation corresponds to measuring the bit error rate (BER) of the output signal from the sub-decision unit to the output signal from the main decision unit 5. This operation works out the value y corresponding to the measured bit error rate. The above-mentioned relation is expressed by the equation, BER=erfc(y), where y is a compliment error function (erfc).

The following approximate equation being an inverse function of a complement error function (erfc) (refer to the paper "Margin Measurements in Optical Amplifier System" by N. S. Bergano et al. in Photonics Technology Letters, Vol. 5, No. 3, 1993, pp-304–306) is known as a calculating equation which can simply obtain the value y from the measured BER.

$$y=f(x)=1.192-0.6681x-0.0162\ x^2$$

(where $x=\log_{10}(BER)$

Figure 3:
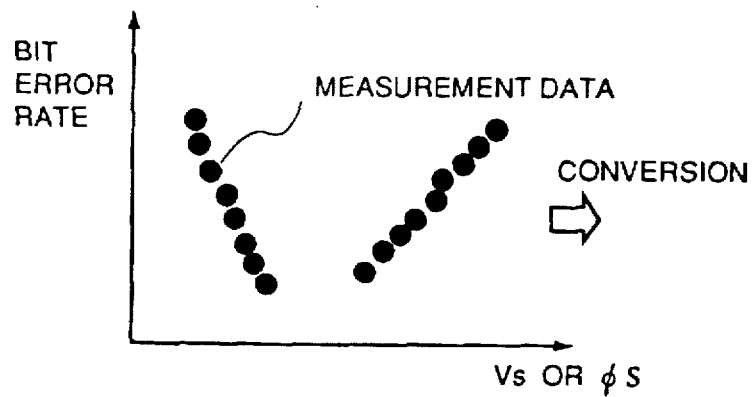
FIG. 3(A) is an explanatory diagram showing an example of calculating an optimum decision point using an automatic decision-point controlling method according to the present invention.
FIG. 3(B) is an explanatory diagram showing an example of calculating an optimum decision point using an automatic decision-point controlling method according to the present invention.
Figure 3:
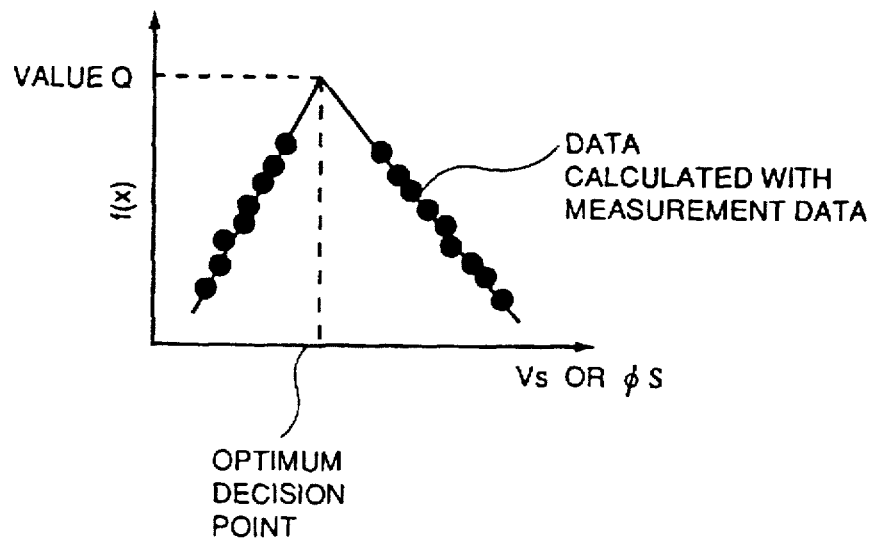

As a result, as shown in FIG. 3(A), values y at the decision point correspond to the mark and space noise distributions and are respectively plotted on straight lines.

As shown in FIG. 3(B), based on the coordinates (x,y) of the intersection of the two straight lines, an optimum decision point is found by the x-coordinate, while a Q value (=signal to noise ratio (SNR) of a receive signal) is found by the Y-coordinate. The value of the optimum decision point is set as an initial value for the main decision unit 5.

Concerning the steady-state control procedure (2): Next, the BER at each decision point is measured by stepwise scanning only the decision point of the sub-decision unit 6 while the decision point of the main decision unit 5 is fixed. Thus, an optimum decision point is calculated according to the same calculating method as that in the initial control procedure (1). Then the decision point of the main decision unit 5 is changed to the value of the newly calculated optimum decision point. To control automatically the decision point of the main decision unit 5 to the optimum value, the steady-state control procedure (2) is repeated.

In the initial control operation (1), the decision voltage Vm of the main decision unit 5 and the decision voltage Vs of the sub-decision unit 6 are stepwise scanned from 0 volt to 1 volt in increments of 0.02 volts while the voltage difference between them are maintained to 0.04 volts.

$$(Vm,Vs)=(0V,0.04V), (0.02V, 0.06V), \ldots, (0.96V,1V)$$

BER was measured for each of the above decision voltages. 25 pieces of data, for example, could be obtained. Of the measured BERs, only data on BERs ranging $10^{-4}$ to $10^{-9}$ are applied to an inverse function of a complement error function to calculate y values by means of the controller 11. Next, of y values obtained with respect to decision voltages Vs of the sub-decision unit 6 increased, data over the range where y increases with Vs is linearly fitted using a least squares method to obtain a linear equation. Similarly, another linear equation is obtained based on data over the range where y decreases with Vs. The X-coordinate of the intersection point is found by solving the simultaneous equation including the two linear equations. The value x corresponds to the optimum decision unit value. The decision voltage Vm of the main decision unit 5 is set to the optimum decision voltage value.

Successively, in the steady state control procedure (2), the decision voltage Vs is scanned stepwise in increments of 0.02 volts while the decision voltage Vm is fixed at a value. To shorten the control operation time per cycle, the decision voltage is scanned over the voltage range where the BER obtained in the initial control procedure (1) is less than $10^{-3}$. In such an operation, the BER is again measured. The Vm is reset by again finding the optimum decision point based on the new BER data. The decision point Vm of the main decision unit 5 is always controlled to the optimum voltage by repeating the steady state control procedure (2).

Experiments were made by using an optical receiver including the automatic decision-point control type decision circuit in an optical amplification repeat transmission system. This transmission system is laid for a total transmission distance of 1000 km and includes optical repeaters arranged in the optical fiber cable every 100 km. As a result, the optimum decision voltage dropped from 0.5 volts before transmission to 0.4 volts after transmission. However, the decision voltage Vm was automatically controlled to 0.4 volts so that stable reception could be realized. This experiment showed effectiveness of the present invention.

The decision voltage and decision phase can be automatically adjusted by alternately controlling them every one loop operation.

Figure 4:
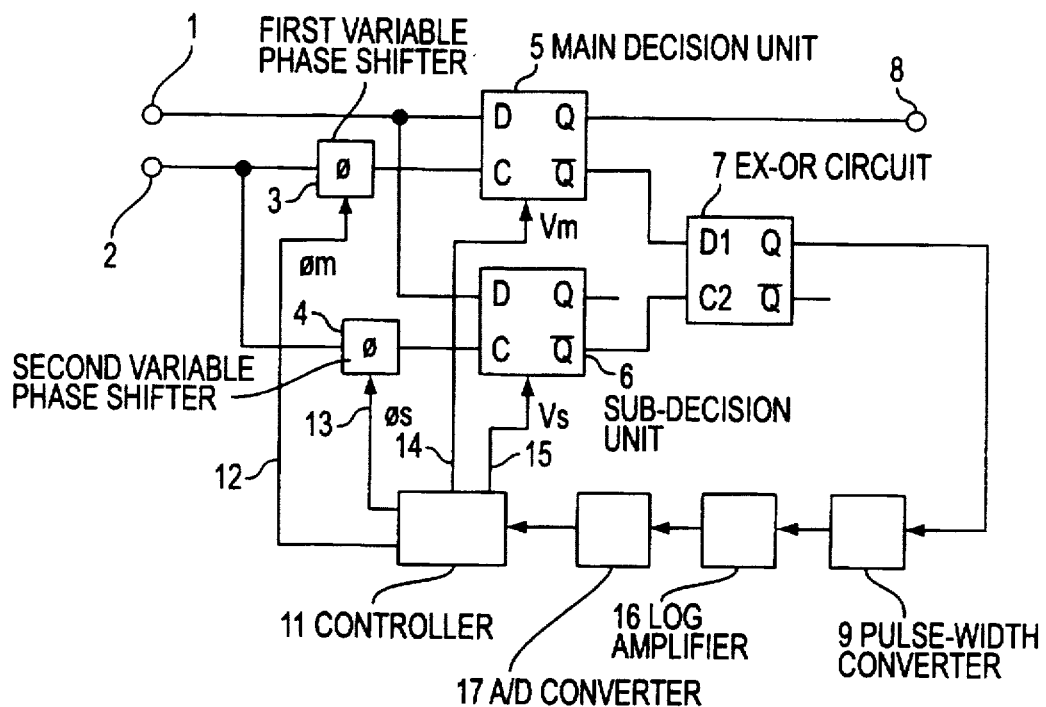
FIG. 4 is a block circuit diagram showing an automatic decision-point control type decision circuit according to a second embodiment of the present invention.
Figure 5:
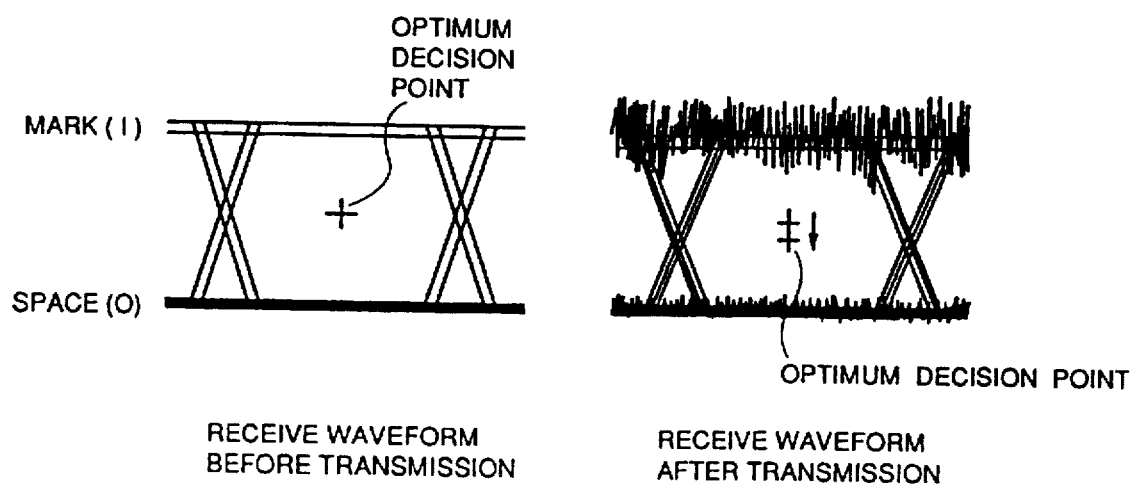
FIG. 5 is a schematic diagram explaining variations of an optimum decision point in a conventional optical-amplification repeat transmission system that amplifies and repeats optical signals for long-distance transmission.

FIG. 4 shows an automatic decision-point control type decision circuit according to the second embodiment of the present invention. In the automatic decision-point control type decision circuit of the second embodiment, a log amplifier 16 and an analog/digital (A/D) converter 17 are used in place of the counter 10 in the first embodiment. This arrangement can detect the number of pulses output from the EX-OR circuit 7 within a fixed period of time.

The A/D converter 17 measures the DC level of the output of the EX-OR circuit 7 which is varied in proportional to the number of pluses. The controller 11 calculates the number of pulses from the DC level of the output of the EX-OR circuit 7. The log amplifier 16 expands the dynamic range of a measurable DC level. The control operation and calculating method are similar to those in the first embodiment.

Like the first embodiment, experiments were made on the optical receiver including the automatic decision-point control type decision circuit arranged in an optical amplification repeater transmission system having a total transmission line of 1000 km. The experiments showed effectiveness of the automatic decision-point control type decision circuit according to the invention.

In this embodiment, main elements including the main decision unit 5, the sub decision unit 6, the EX-OR circuit 7, and others are differently shown. However, these elements can be integrated in the form of an integrated circuit (IC) so that an automatic decision-point control type decision circuit can be realized in smaller size and at lower cost and with higher quality.

In the first embodiment, the main decision unit 5 outputs a decision data signal from its Q output terminal and a control signal capture data signal from its Q (bar) output terminal. The sub-decision unit 6 outputs a control signal capture data signal from its Q (bar) output signal. However, the control signal capture data signal may be output from the Q output terminals of the main decision unit 5 and the sub-decision unit 6.

The controller 11 subtracts data earlier captured a fixed period of time from newly captured data to calculate the number of pulses counted within a fixed measurement time. However, the number of pulses can be detected by resetting the counter 10 with a reset signal output from the controller 11 every fixed time.

An approximate equation of an inverse function of the complement error function has been used to find y based on BER. However, When the controller 11 has its high-speed calculating ability, the complement error function can be numerically solved using a calculating method such as bisection method. Thus, the value y can be calculated using more precise calculation equations.

As described above, in the automatic decision-point control type decision circuit according to the present invention, a bit error rate is detected based on the difference between the output from the main decision unit and the output of the sub-decision circuit by scanning the decision point of the sub-decision unit. Furthermore, the decision point of the main decision unit is controlled by calculating an optimum decision point based on the relationship between the decision point and the bit error rate. The bit error rate can be obtained by counting the number of pulses output from the EX-OR circuit every fixed time.

Therefore, both the main decision unit and the sub-decision unit can be differently controlled to the optimum decision point in accordance with a similar control procedure by differently changing the decision voltage and the decision phase.

The control method according to the present invention can provide a small, low-cost automatic decision-point control type decision circuit.

The entire disclosure of Japanese Patent Application No. 160154/1996 filed on Jun. 20, 1996 including specification, claims, drawing and summary are incorporated herein by reference in its entirety.

What is claimed is:

1. An automatic decision-point control type decision circuit comprising:

a first variable phase shifter for receiving a first clock signal being obtained by branching a clock signal into two;

a second variable phase shifter for receiving a second clock signal being obtained by branching said clock signal into two;

a main decision unit for receiving a clock signal output from said first variable phase shifter and a first data signal being obtained by branching a data signal into two;

a sub-decision unit for receiving a clock signal output from said second variable phase shifter and a second data signal being obtained by branching said data signal into two;

an exclusive-OR circuit for receiving output of said main decision unit and output of said sub-decision unit;

a counter for counting the number of pulses output from said exclusive-OR circuit; and a controller for calculating a bit error rate from data of output of said counter and for controlling a decision point of said main decision unit and a decision point of said sub-decision unit.

2. The device of claim 1, wherein said controller comprises means for:

setting a main decision voltage of said main decision unit to Vm and a sub-decision voltage of said sub-decision unit to Vs;

scanning the voltages Vs and Vm at the beginning of a control operation, wherein said voltages Vs and Vm are changed in a stepwise manner, while the difference between Vm and Vs is maintained to ΔV;

measuring the number of pulses counted during a predetermined measurement time for each value of the voltage Vs, based on an output of said counter;

calculating a bit error rate based on the number of said pulses and said measurement time;

calculating a value y by substituting said bit error rate for an inverse function of a complement error function;

calculating an optimum decision voltage based on a relationship between said value of the voltage Vs and said value y; and changing an initial value of Vm into said optimum decision voltage.

3. The device claimed in claim 1, wherein said controller comprises means for:

setting a main decision phase of said decision unit to ⌀m and a sub-decision phase of said sub-decision unit to ⌀s;

scanning the phase ⌀s at the beginning of a control operation, wherein said phase ⌀s is changed in a stepwise manner, while the difference between ⌀m and ⌀s is maintained to Δ⌀;

measuring the number of pulses counted during a predetermined measurement time for each value of the phase ⌀s, based on an output of said counter;

calculating a bit error rate based on the number of said pulses and said measurement time;

calculating a value y by substituting said bit error rate for an inverse function of a complement error function;

calculating an optimum decision phase based on a relationship between said value of the phase øs and said value y; and varying an initial value of øm into said optimum decision phase.

4. The device claimed in claim 1, wherein said controller comprises means for:

setting a main decision voltage of said main decision unit to Vm and a sub-decision voltage of said sub-decision unit to Vs;

scanning the voltage Vs, wherein said voltage Vs is changed in a stepwise manner, while Vm is maintained at a fixed value;

measuring the number of pulses counted during a predetermined measurement time for each value of the voltage Vs, based on an output of said counter;

calculating a bit error rate based on the number of said pulses and said measurement time;

calculating a value y by substituting said bit error rate for an inverse function of a complement error function;

calculating an optimum decision voltage based on a relationship between said value of the voltage Vs and said value y;

varying an initial value of Vm into said optimum decision voltage; and repeating the above-described control operation to control Vm to an optimum decision voltage.

5. The device defined in claim 1, wherein said controller comprises means for:

setting a main decision phase of said main decision unit to øm and a decision phase of said sub-decision unit to øs;

scanning a phase øs at the beginning of a control operation, wherein said phase øs is changed in a stepwise manner, while øm is maintained at a fixed value;

measuring the number of pulses counted during a predetermined measurement time for each value of the phase øs, based on an output of said counter;

calculating a bit error rate based on the number of said pulses and said measurement time;

calculating a value y by substituting said bit error rate for an inverse function of a complement error function;

calculating an optimum decision phase based on a relationship between said value of the phase øs and said value y;

varying øm into said optimum decision phase; and repeating the above-described control operation so that øm is continually reset to an optimum decision phase value.

6. The device claimed in claim 1, wherein said controller comprises means for:

alternately performing a first control and a second control; said first control for performing operations including the steps of setting a main decision voltage of said main decision unit to Vm and a sub-decision voltage of said sub-decision unit to Vs;

scanning a voltage Vs, wherein said voltage Vs is changed in a stepwise manner, while Vm is maintained at a fixed value;

measuring the number of pulses counted during a predetermined measurement time for each value of the voltage Vs, based on an output of said counter;

calculating a bit error rate based on the number of said pulses and said measurement time;

calculating a value y by substituting said bit error rate for an inverse function of a complement error function;

calculating an optimum decision voltage based on a relationship between said value of the voltage Vs and said value y; and varying an initial value of Vm into said optimum decision voltage;

said second control including the steps of setting a main decision phase of said main decision unit to øm and a decision phase of said sub-decision unit to øs;

scanning a phase øs at the beginning of a control operation, wherein said phase øs is changed in a stepwise manner, while øm is maintained at a fixed value;

measuring the number of pulses counted during a predetermined measurement time for each value of the phase øs, based on the output of said counter;

calculating the bit error rate based on the number of said pulses and said measurement time;

calculating the value y by substituting said bit error rate for an inverse function of a complement error function;

calculating an optimum decision phase based on a relationship between said øs and said y; and varying øm into said optimum decision phase.

7. The device claimed in claim 1, further comprising means for expanding pulse width of a pulse output from said exclusive-OR circuit.

8. A method for automatic control of decision voltage comprising the steps of:

setting a main decision voltage to Vm and a sub-decision voltage to Vs;

scanning the voltages Vm and Vs at the beginning of a control operation, wherein said voltages Vm and Vs are changed in a stepwise manner, while the difference between Vm and Vs is maintained to ΔV;

measuring the number of pulses counted during a predetermined measurement time for each value of the voltage Vs;

calculating a bit error rate based on the number of said pulses and said measurement time;

calculating a value y by substituting said bit error rate for an inverse function of a complement error function;

calculating an optimum decision voltage based on a relationship between said value of the voltage Vs and said value y; and changing an initial value of Vm into said optimum decision voltage.

9. A method for automatic control of decision phase comprising the steps of:

setting a main decision phase to øm and a sub-decision phase to øs;

scanning the phases øm and øs at the beginning of a control operation, wherein said phases øm and øs are changed in a stepwise manner, while the difference between øm and øs is maintained to Δø;

measuring the number of pulses counted during a predetermined measurement time for each value of the phase øs;

calculating a bit error rate based on the number of said pulses and said measurement time;

calculating a value y by substituting said bit error rate for an inverse function of a complement error function;

calculating an optimum decision phase based on a relationship between said value of the phase øs and said value y; and changing an initial value of øm into said optimum decision phase.

10. A method for automatic control of decision voltage Vm comprising the step of repeating a control operation to control Vm to an optimum decision voltage;

said repeating step including the steps of:
   setting a main decision voltage to Vm and a sub-decision voltage to Vs;
   scanning the voltage Vs, wherein said voltage Vs is changed in a stepwise manner, while Vm is maintained at a fixed value;
   measuring the number of pulses counted during a predetermined measurement time for each value of the voltage Vs;
   calculating a bit error rate based on the number of said pulses and said measurement time;
   calculating a value y by substituting said bit error rate for an inverse function of a complement error function;
   calculating an optimum decision voltage based on a relationship between said value of the voltage Vs and said value y;
   varying an initial value of Vm into said optimum decision voltage.

11. A method for automatic control of decision phase øm comprising the step of repeating a control operation to maintain øm an optimum decision phase;

said repeating step including the steps of:
   setting a main decision phase to øm and a sub-decision phase to øs;
   scanning the phase øs at the beginning of a control operation, wherein said phase øs is changed in a stepwise manner, while øm is maintained at a fixed value;
   measuring the number of pulses counted during a predetermined measurement time for each value of the phase øs;
   calculating a bit error rate based on the number of said pulses and said measurement time;
   calculating a value y by substituting said bit error rate for an inverse function of a complement error function;
   calculating an optimum decision phase based on a relationship between said value of the phase øs and said value y; and
   changing øm to said optimum decision phase.

12. A method for automatic control of decision point comprising the step of repeating a control operation so as to maintain Vm at an optimum decision voltage;

said repeating step including the steps of:
   setting a main decision voltage to Vm and a sub-decision voltage to Vs;
   scanning the voltage Vs, wherein said voltage Vs is changed in a stepwise manner, while Vm is maintained at a fixed value;
   measuring the number of pulses counted during a predetermined measurement time for each value of the voltage Vs;
   calculating a bit error rate based on the number of said pulses and said measurement time;
   calculating a value y by substituting said bit error rate for an inverse function of a complement error function;
   calculating an optimum decision voltage based on a relationship between said Vs and said y;
   varying an initial value of Vm into said optimum decision voltage;
   setting a main decision phase to øm and a decision phase to øs;
   scanning the phase øs at the beginning of a control operation, wherein said phase øs is changed in a stepwise manner, while øm is maintained at a fixed value;
   measuring the number of pulses counted during a predetermined measurement time for each value of the phase øs;
   calculating a bit error rate based on the number of said pulses and said measurement time;
   calculating a value y by substituting said bit error rate for an inverse function of a complement error function;
   calculating an optimum decision phase based on a relationship between said value of the phase øs and said value y; and varying øm into said optimum decision phase.

* * * * *